United States Patent
Diez

[11] Patent Number: 5,913,254
[45] Date of Patent: Jun. 15, 1999

[54] METHOD AND APPARATUS FOR HANDLING A WHEEL ON A TIRE FITTING MACHINE

[75] Inventor: Ulrich Diez, Reichshof, Germany

[73] Assignee: Hofmann Werkstatt-Lechnik GmbH, Pfungstadt, Germany

[21] Appl. No.: 08/996,395

[22] Filed: Dec. 22, 1997

[30] Foreign Application Priority Data

Dec. 20, 1996 [DE] Germany .......................... 196 53 664

[51] Int. Cl.$^6$ .................................................. G01N 33/00
[52] U.S. Cl. ............................................ 73/866; 73/865.8
[58] Field of Search ........................ 73/487, 866, 865.7, 73/865.8; 324/232, 234, 236, 260, 262; 301/5.1, 5.21, 37.31, 40.4, 86, 87, 111

[56] References Cited

U.S. PATENT DOCUMENTS

| | | | |
|---|---|---|---|
| 4,133,363 | 1/1979 | Gardner | 157/1.3 |
| 4,250,936 | 2/1981 | du Quesne | 157/17 |
| 4,335,772 | 6/1982 | Bubik et al. | 157/1.28 |
| 5,222,538 | 6/1993 | Tomita et al. | 157/1.24 |
| 5,226,465 | 7/1993 | Schon et al. | 157/1.28 |

FOREIGN PATENT DOCUMENTS

0001855A1  6/1979  European Pat. Off. .

*Primary Examiner*—Hezron Williams
*Assistant Examiner*—Helen C. Kwok
*Attorney, Agent, or Firm*—Pillsbury Madison & Sutro LLP

[57] ABSTRACT

A method and an apparatus for handling a motor vehicle wheel on a tire fitting machine in which the wheel is clamped fast by means of clamping elements on the inside at the wheel rim dish or on the outside at the wheel rim flanges. Prior to the wheel being clamped fast the wheel material is sensed by means of a sensor and, in the case of a non-ferromagnetic material, a signal for a material-protective clamping procedure and/or for a material-protective tire fitting or removal procedure is outputted by a signal generator actuated by the sensor.

31 Claims, 2 Drawing Sheets

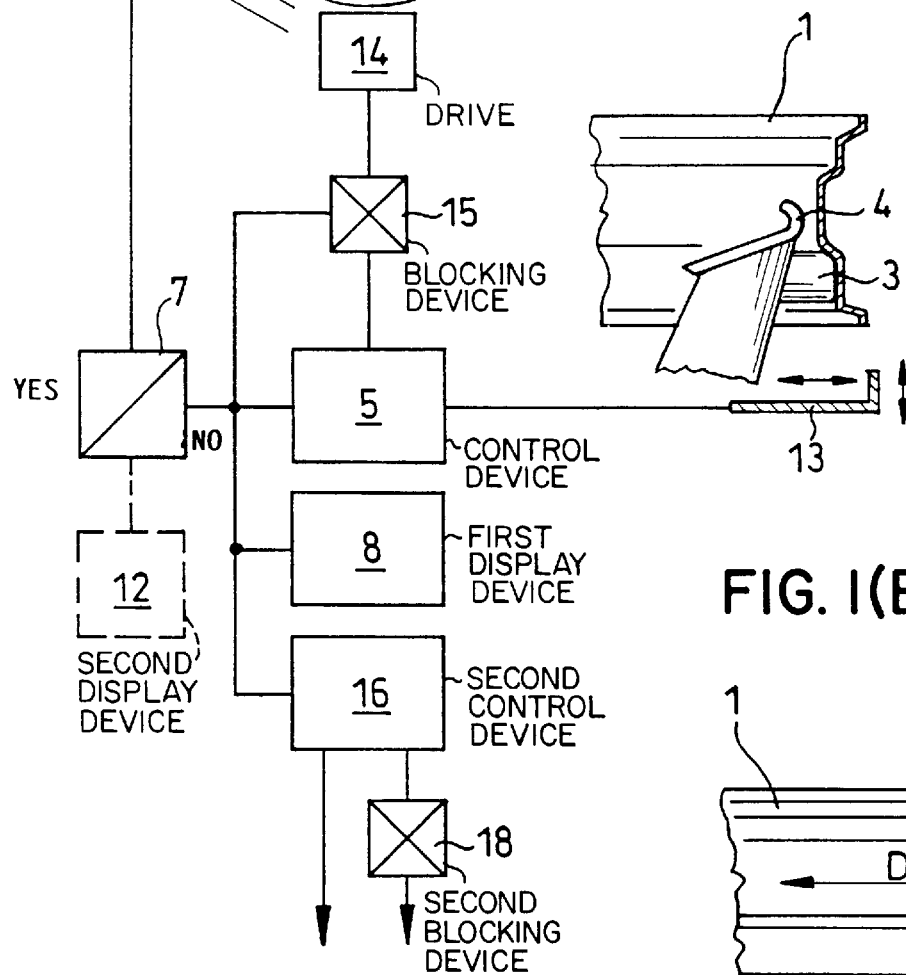
FIG. I(A)
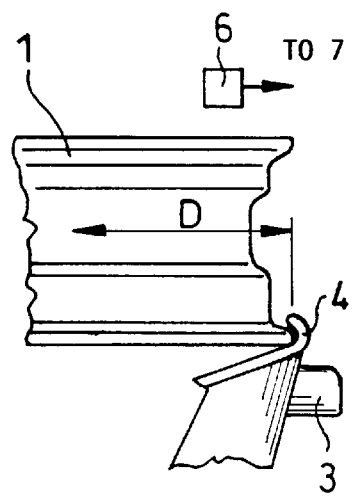
FIG. I(B)

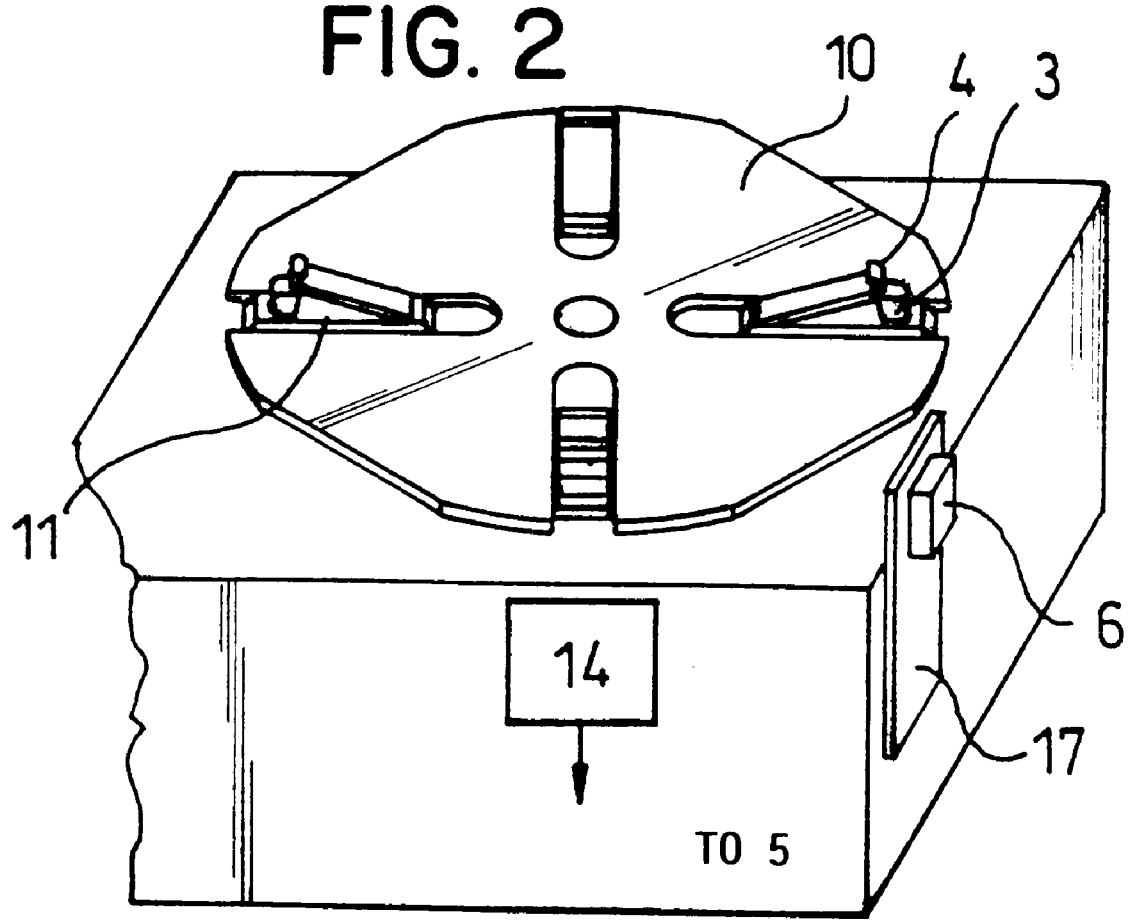

METHOD AND APPARATUS FOR HANDLING A WHEEL ON A TIRE FITTING MACHINE

FIELD OF THE INVENTION

The invention concerns a method and apparatus for handling a wheel of a motor vehicle wheel unit comprising the wheel and a pneumatic tire thereon, on a tire fitting machine in which the wheel is clamped fast by clamping elements.

BACKGROUND OF THE INVENTION

A method and apparatus for handling the wheel of a motor vehicle wheel unit which thus consists of the wheel itself and a pneumatic tire fitted thereon, on a tire fitting machine in which the wheel to be handled is clamped fast on a rotary base by means of displaceable clamping elements can be found for example in the monty-centuro prospectus from Hofmann Werkstatt-Technik GmbH, Pfungstadt, Germany, imprint 9402449 01.95 or the monty prospectus also from Hofmann Werkstatt-Technik GmbH, Pfungstadt, Germany, imprint 9402445 11.94.

In the procedure involved in fitting a pneumatic tire to a wheel such as a disk wheel, the bare wheel is fixed to the tire fitting machine by means of suitable clamping elements and then the tire is fitted on to the wheel itself by means of the appropriate tools on the fitting machine. To remove a pneumatic tire from a wheel such as a disk wheel the motor vehicle wheel unit consisting of the wheel with tire thereon is secured to the fitting machine by means of the same clamping elements. The tire can then be removed from the wheel by removal tools which are also provided on the machine. The fitting and removal tools can be brought into operation in such a way as to handle the wheel material carefully when dealing with special wheels consisting of light metal or alloy, for example aluminum, magnesium, titanium or alloys thereof.

It will be noted at this point that the term light metal is used herein to denote both light metal and also an alloy thereof as is frequently used for the production of motor vehicle wheels.

The wheel can be clamped in position on the tire fitting machine from the outside or from the inside of the wheel. When the wheel is clamped in position from the outside, clamping elements which are in the form of clamping jaws engage one of the two wheel rim flanges. The clamping elements can be moved in a radial direction in relation to the wheel in order to hold it firmly in position on the machine. When a wheel is clamped from the inside, clamping jaws engage the inside surface of the wheel dish or center.

The clamping jaws which engage the wheel from the inside or from the outside are mounted on radially movable clamping arms or clamping shoes. It is also possible for the wheel to be fixed in position on the machine by means of a clamping arrangement, using one or more clamping cones engaging into the central opening in the disk part of the wheel. That way of fixing the wheel in the fitting machine is similar to that which is used when securing a motor vehicle wheel on the main shaft of a balancing machine for balancing the wheel. A suitable holding assembly which ensures that the wheel is suitably supported at the center thereof can provide for preliminary positioning of the wheel in the tire fitting machine before the wheel is definitively clamped in position. The holding assembly can be of a plate-like configuration and may possibly be of a sprung nature.

In order to ensure that in particular light metal wheel rims of for example aluminum, magnesium, alloys thereof or the like are handled carefully so as not to cause damage to the wheel, rubber or plastic covers or pads may be provided on the clamping jaws of the tire fitting machine. Under the rough operating conditions found in a workshop however those rubber or plastic covers or pads wear away so that in particular light metal wheel rims or paint on a wheel rim may be damaged when the wheel is clamped in place. In many cases it is difficult for the machine operators to ascertain by visual inspection whether they are dealing with a wheel made of light metal or alloy, or a wheel made of steel, as in many cases the paint used on disk wheels is identical.

SUMMARY OF THE INVENTION

An object of the present invention is to provide a method of handling the wheel of a motor vehicle wheel unit on a tire fitting machine which is such as substantially to prevent damage to the wheel rim when clamped on the machine.

Another object of the present invention is to provide a method of handling a motor vehicle wheel in a tire fitting machine which is such as to ensure that the wheel is unlikely to suffer damage and which also indicates to the machine operator the nature of the wheel with which he is dealing.

Still a further object of the present invention is to provide a method of handling a motor vehicle wheel in a tire fitting machine which provides for careful handling thereof such as to at least substantially prevent damage thereto while involving a simple operating procedure without requiring active operator intervention.

Yet another object of the present invention is to provide an apparatus for handling a motor vehicle wheel in a tire fitting machine which in a substantially automated fashion can provide for handling of the wheel with a selectively higher degree of care.

In accordance with the present invention, in the method aspect, the foregoing and other objects are attained by a method of handling the wheel such as a disk wheel of a motor vehicle wheel unit consisting of the wheel and a pneumatic tire thereon, on a tire fitting machine in which the wheel is clamped fast in position by clamping means, wherein, prior to the operation of clamping the wheel fast in position in the machine, the wheel is sensed by means of a sensor responsive to the wheel material, for example a ferromagnetic material. When the wheel is of a non-ferromagnetic material, a signal is outputted by a signal generator actuated by the sensor, to provide for a material-protective clamping procedure or a material-protective pneumatic tire fitting or removing procedure. This therefore ensures that the procedure involving the wheel in the machine is implemented in such a manner as to protect the material of the wheel.

Also in accordance with the invention, in the apparatus aspect, the foregoing and other objects are attained by an apparatus for handling a wheel such as a disk wheel of a motor vehicle wheel unit in a tire fitting machine having clamping means movable into engagement with the wheel to clamp it in position in the machine, comprising a sensor responsive to ferromagnetic material and actuatable by the initiation of movement of the clamping means, for coming into operative relationship with the wheel material for sensing same.

As will be seen from a detailed description of preferred embodiments of the invention as set out hereinafter, the method and apparatus of the invention provide that, before the wheel is clamped fast in position, the material of the wheel is sensed by means of a sensor and, in the case of a wheel consisting of a non-ferromagnetic material such as more particularly aluminum, magnesium or titanium or a cast alloy of such a material, a signal is outputted by a signal generator which is actuated by the sensor, to provide for a wheel-clamping procedure and/or a tire-fitting or tire-removal procedure, such as to ensure that the material of the wheel is treated carefully. In that way, whenever a wheel of light metal is to be clamped in position in the machine, the signal for the working steps which are to be performed in such a way as to deal with the wheel carefully can remind the service operator that covers or pads for protecting the light metal of the wheel rim have to be fitted to the clamping elements of the tire fitting machine, or that such covers or pads have to be checked in order to ensure that they are still fully operational. The method and apparatus further ensure that a tire fitting or tire removal operation is to be implemented, using fitting or removal tools which are such as to not cause damage to the wheel being processed. For that purpose the machine can output an acoustic or visual signal which represents a recommendation to proceed in that way. If the wheel to be fixed in the tire fitting machine is fixed at the central hole in the wheel, then the clamping means used for that purpose are to be such as to protect the wheel material.

Furthermore, in the case of tire fitting machines which clamp a wheel both at the inside and also at the outside, the drive assembly for operating the clamping elements of the machine can be actuated in such a way that a clamping procedure at the inside of the wheel rim dish is blocked or arrested when the sensor has detected that the wheel material is a light metal or alloy. The clamping procedure is then controlled in such a way that the clamping elements engage the wheel rim edge from the exterior.

In that respect it is advantageous for the dimensions of the wheel and in particular the diameter of the wheel rim flanges to be measured. That diameter is inputted into the apparatus for the purposes of controlling the movement of the clamping elements so that the clamping elements are moved to a radius which corresponds to the wheel rim flanges of the disk wheel and at which the clamping elements appropriately come into engagement with the corresponding wheel rim flange.

Prior to the clamping operation being implemented, the wheel can be supported on a holding device, in particular at the center of the wheel. In that case the operation of sensing the material of the wheel can be effected on the wheel when it is in a condition of being supported by the holding device.

The invention preferably uses a sensor of a simple design configuration and which is responsive to ferromagnetic material and in particular only to ferromagnetic material. For that purpose, use may be made of inductive proximity switches of usual design (attention may be directed in this respect to 'Elektrotechnik' 57, issue 24.27, December 1975, pages 39 through 42).

It is however also possible to use other sensors which are for example galvanically or capacitively coupled to the material of the wheel. It is sufficient for the sensor to react to ferromagnetic material. On the basis of a yes/no decision which is contained in a logic connected to the sensor, it is then possible to produce the signal required for the material-protective clamping procedure. If the wheel comprises a ferromagnetic material, for example and in particular steel, that signal is not required. However there may be a display by means of a further signal which indicates to the operator that a wheel of steel is to be clamped in position.

The signal produced to provide for the material-protective clamping procedure or tire fitting or removal procedure can also be evaluated in such a way that support elements, for example clamping arms or clamping shoes, with which the clamping elements are brought into engagement with the wheel in the clamping procedure, can be fitted with additional clamping elements which have protective covers or pads thereon. The support elements which transmit the clamping movement can be provided with further clamping elements which are used when wheels of steel are being clamped in position. That possibility of making alternate use of clamping elements intended for steel wheels and clamping elements intended for light metal wheels means that the clamping elements which have the protective covers or pads thereon are only used when necessary in connection with light metal wheels, whereby the clamping elements with the protective covers or pads enjoy a longer service life than if they were used for clamping all kinds of wheels.

The operation of sensing the material of the wheel can already be effected before the tire beads are pushed away from the wheel rim flanges, if for example a tire mounted on a wheel is to be removed from the wheel on the machine. In general, the tire beads are pushed off the wheel rim flanges before the wheel is fixed to the machine. That operation can be effected by using a pressing blade member, in which case the wheel is pressed against a support surface provided on the outside of the casing of the machine.

If the tire fitting machine is operating in conjunction with a balancing machine, for example in a tire servicing installation, the information obtained in the operation of sensing the material of the wheel can be evaluated for the balancing program which is to be adopted when balancing the wheel on the balancing machine. If it has been found that the wheel comprises a non-ferromagnetic material, more particularly for example light metal such as aluminum, magnesium or an alloy thereof, more especially in the form of a die casting, then a balancing program which is suitable for such wheels, which preferably involve the use of adhesive weights, can be selected at the balancing machine. If it has been found that the wheel comprises a ferromagnetic material, for example and more particularly steel, then a normal program for the balancing procedure can be selected at the balancing machine, and in that case it is preferably to use clip-on weights which are hammered into place on the wheel rim flanges.

If the machine has different tools for use with steel wheels and light metal wheels of for example aluminum or magnesium cast alloy, then in situations in which it has been found that the wheel to be handled consists of non-ferromagnetic material, the tire fitting or removal tools which are intended for use with steel wheels can be blocked to prevent them from being used with the light metal wheels.

Further objects, features and advantages of the invention will be apparent from the following description of preferred embodiments thereof.

BRIEF DESCRIPTION OF THE DRAWING

FIGS. 1A and 1B are a diagrammatic view of a first embodiment, and

FIG. 2 is a perspective view of a second embodiment.

DESCRIPTION OF THE PREFERRED EMBODIMENTS

Referring firstly to both FIGS. 1 and 2, shown therein are the means on a tire fitting machine for fixing a wheel such as a disk wheel 1 or a motor vehicle wheel unit consisting of the wheel and a pneumatic tire fitted thereon, on the tire fitting machine. The illustrated means include clamping elements 3 in the form of clamping jaws which can be pressed against the inside surface of the rim of the disk wheel. The machine also has clamping elements 4 which in the form of clamping claws engage from the exterior against one of the wheel rim flanges of the wheel 1. The procedure involving clamping the wheel 1 from the interior is diagrammatically shown for a single clamping element in FIG. 1(A), while the procedure for clamping a wheel from the exterior, for a single clamping element, is diagrammatically shown in FIG. 1(B). In the illustrated embodiment in FIG. 1 the two clamping elements 3 and 4 are carried on respective clamping arms 2 which perform inward and outward spreading movements for clamping the wheel 1 in position in the tire fitting machine.

Reference will be made at this stage to FIG. 2 from which it will be seen that the clamping elements 3 and 4 are carried on clamping shoes 11 which are displaced in a radial direction on a clamping plate member 10.

As is diagrammatically shown in FIGS. 1(A) and (B), a sensor 6 which is responsive to the material of the wheel 1 can be disposed in the proximity thereof. The sensor 6 can be coupled to the material of the wheel 1 for sensing same galvanically, inductively or capacitively. In dependence on the material of the wheel 1 the sensor 6 produces an electrical signal which is evaluated in a logic circuit as indicated at 7. The signal is thus outputted by a signal generator actuated by the sensor in response to the material of the wheel 1.

Preferably, the illustrated embodiment uses a sensor which is responsive to ferromagnetic material. A yes/no evaluation of the signal supplied by the sensor 6 is effected in the logic circuit 7. For that purpose the sensor 6 can preferably be in the form of an inductive proximity switch. If the wheel 1 comprises a ferromagnetic material, more especially steel, there is no need to take additional steps to protect the material of the wheel in the clamping operation, when handling the wheel. There is therefore no need for the service operator to be informed by a particular visual or acoustic display or indication that the wheel which is to be clamped in position on the tire fitting machine is of steel. It will be appreciated however that an in particular visual display of that kind may be provided. As shown in broken line in FIG. 1 that display can be afforded by means of a second display device 12.

If the sensor 6 detects a non-ferromagnetic wheel material, the logic circuit 7 actuates a first display device 8 which produces an optical and/or acoustic signal. That display is an indication to the operator that the wheel-clamping operation must be carried out in such a way as to protect the wheel material. For example, it is then necessary to check whether protective caps or protective covers are fitted to the clamping elements, in particular the clamping elements 4 which engage the wheel 1 from the exterior, for example as shown in FIG. 1(B). If one or more of the protective caps or covers is missing or defective, then the display produced by the first display device 8 causes the operator to replace the missing or defective protective cap or cover.

At the same time a control device 5 can be actuated by the logic circuit 7 such that, in dependence on the detected diameter D of the wheel rim, in particular in the region of the wheel rim flanges, the clamping arms 2 in FIG. 1 or the clamping shoes 11 in FIG. 2 are moved by such a distance that they engage the wheel rim flange or the downwardly disposed wheel rim flange of the wheel 1, from the exterior thereof, as shown in FIG. 1(B). The wheel diameter D can be ascertained by means of a sensing device 13 for determining the geometrical data of the wheel, in a contact-less mode or with sensing elements which contact the wheel. For that purpose the sensing device 13 is operatively connected to the control device 5. The control device 5 carries out a comparison and controls a drive 14 for the clamping arms 2 or the clamping shoes 11 in such a way that, as already discussed above, the clamping elements 4 engage the wheel 1 from the exterior. That prevents the wheel 1 from being clamped from the inside thereof.

The sensor 6 can be so provided that it can be moved by hand into the proximity of the wheel 1 or into a condition of bearing against same. It is also possible however for the sensor 6 to be provided on the holding device or holding plate member 9 of the embodiment shown in FIG. 1 or the clamping plate member 10 of the embodiment shown in FIG. 2. The drive 14 for the clamping arms 4 or the clamping shoes 11 is controlled in such a way that the operation of ascertaining the material of the wheel by means of the sensor 6 is implemented first. The drive 14 for the clamping arms 2 or the clamping shoes 11 remains blocked until the procedure for sensing the wheel to be clamped in position on the tire fitting machine has been concluded. The blocking action for the drive 14 is removed only when the sensing result from the sensor 6 is available and has been inputted into the logic circuit 7 and when, on the basis of a yes/no decision, the logic circuit 7 has decided whether the wheel 1 comprises ferromagnetic material, in particular steel, or non-ferromagnetic material, for example aluminum. For that purpose, a blocking device 15 which is operable to block the drive 14 is released by the operation of the logic circuit 7. Then, in dependence on the information from the logic circuit 7, the first control device 5 can operate the clamping arms 2 or the clamping shoes 11 for the correct movement thereof.

With the present invention it is sufficient to use a sensor 6 which is only responsive to ferromagnetic material, for example an inductive proximity switch of known design. In combination with the logic circuit 7 which implements a yes/no decision, the arrangement can then produce a material-specific electrical signal which can be used to provide the operator with a display indicating whether a standard clamping procedure for a steel wheel is to be effected or whether a material-protective clamping procedure for a light metal wheel such as an aluminum alloy wheel is to be implemented.

Preferably, before the wheel 1 is definitively fixed in position by the clamping elements the wheel 1 can be laid on the holding device or holding plate member 9 in the embodiment of FIG. 1 or the clamping plate member 10 in the embodiment of FIG. 2, and pre-mounted in position in the tire fitting machine by way of a screw connection which is fitted through the centering bore. The operation of sensing the material of the wheel 1 is then effected by the sensor 6 which is disposed in the region of the holding device 9 or in the region of the clamping plate member 10.

In a preferred operating procedure, the step of sensing the material of the wheel can be effected before the tire beads are pressed off the wheel rim flanges. For that purpose, before the wheel 1 is clamped to or fixed to the tire fitting machine, the sensor 6 can be moved to the wheel 1 in order to sense the material thereof. Furthermore, for that purpose, the sensor 6 can be provided in the region of a support surface 17 at the outside of the casing of the tire fitting machine, as shown in FIG. 2. The wheel is applied against that surface 17 in the operation of pressing the tire beads off the wheel rim.

The step of sensing the material of the wheel 1 can also be utilised for a subsequent fitting operation in which a pneumatic tire is fitted on to the wheel 1 or in a removal procedure in which the tire is removed from the wheel. In that case, in dependence on the result of the detection of material by means of the sensor 6, suitable tools for fitting and removing the tire can be operated by means of a second control device 16 connected to the logic circuit 7. That mode of control can be such that actuation of tire-fitting or removal tools which are intended for steel wheels is blocked by means of a second blocking device 18 when the wheel on the tire fitting machine is a light metal wheel, so that in that situation it is only possible to use the appropriate fitting and removal tools which will handle the light metal wheel carefully. The second blocking device 18 can for example block shut off valves (not shown) which are provided for pneumatic actuation of the tools to be used when dealing with steel wheels. That block on actuation of the tools for use with steel wheels is removed when the sensor 6 detects that the wheel to be handled is a steel wheel.

It will be appreciated that the above-described embodiments of the invention have been set forth solely by way of example and illustration of the method and apparatus of the invention and that various modifications and alterations may be made therein without thereby departing from the spirit and scope of the invention.

What is claimed is:

1. A method of handling a wheel of a motor vehicle wheel unit on a tire fitting machine comprising the steps of:

sensing of the wheel with a sensing element responsive to a wheel material; and clamping the wheel fast in position with a clamping element, wherein in the case of a wheel of a non-ferromagnetic material, the method further comprises the step of:
        outputting a signal by a signal generator which is actuated by the sensing element to ensure that a procedure involving the non-ferromagnetic wheel in the machine is implemented in a material-protective manner.

2. A method as recited in claim 1, wherein said procedure is a procedure for clamping the wheel of the motor vehicle wheel unit in the machine.

3. A method as recited in claim 1, wherein said procedure is a procedure for fitting a tire to the wheel of the motor vehicle wheel unit.

4. A method as recited in claim 1, wherein said procedure is a procedure for removing a tire from the wheel of the motor vehicle wheel unit.

5. A method as recited in claim 1, wherein said sensor is responsive to ferromagnetic material.

6. A method as recited in claim 1, wherein a display is triggered by the signal.

7. A method as recited in claim 6, wherein said display is an optical display.

8. A method as recited in claim 6, wherein said display is an acoustic display.

9. A method as recited in claim 1, wherein in a machine which clamps a wheel rim from the inside and the outside, the procedure from the inside is blocked by the signal.

10. A method as recited in claim 1, further comprising the step of:

measuring the dimensions of the wheel of a motor vehicle wheel unit.

11. A method as recited in claim 10, further comprising the step of:

measuring the diameter of rim flanges of the wheel of the motor vehicle wheel unit.

12. A method as recited in claim 11, wherein the clamping element are moved by the signal to a radius corresponding to the rim flanges of the wheel.

13. A method as recited in claim 1, wherein the wheel of a motor vehicle wheel unit is supported prior to the clamping operation on a holding device.

14. A method as recited in claim 1, wherein the wheel of the motor vehicle wheel unit is supported in a holding device and is sensed prior to the clamping operation.

15. A method as recited in claim 1, wherein the operation of sensing the material of the wheel is effected before tire beads are pressed off the rim flanges.

16. A method recited forth in claim 1, wherein when a non-ferromagnetic material is sensed fitting and removing tools for the handling of steel wheels are blocked.

17. A method as recited in claim 1, wherein for the selection of a wheel-balancing program said signal is fed into an electronic balancing machine system for a subsequent balancing procedure.

18. An apparatus for handling a wheel of a motor vehicle wheel unit on a tire fitting machine, comprising:

a clamping element movable into engagement with the wheel to clamp it in the machine; and a sensor responsive to a wheel material and actuatable by the initiation of movement of the clamping element for coming into operative coupling relationship with the wheel material and for sensing same.

19. Apparatus as recited in claim 18, wherein the sensor is adapted to be galvanically coupled to the wheel material.

20. Apparatus as recited in claim 18, wherein the sensor is adapted to be inductively coupled to the wheel material.

21. Apparatus as recited in claim 18, wherein the sensor is adapted to be capacitively coupled to the wheel material.

22. An apparatus as recited in claim 18, further including:

a logic circuit connected to the sensor for implementing a yes/no decision; and a display device for a material-protective procedure in the machine, the display device being actuatable by the logic circuit in dependence on said decision.

23. An apparatus as recited in claim 22, further including:

a drive for the clamping element; and means for blocking adapted to block operation of said drive and to be released by said logic circuit.

24. An apparatus as recited in claim 23, further including:

a first control device for the drive of the clamping element, the control device being connected to the logic circuit.

25. An apparatus as recited in claim 24, further including:

a sensing device for sensing geometrical data of a disk wheel and also connected to the first control device.

26. An apparatus as recited in claim 24, further including:

a second control device for actuation of the tire fitting and removal tools of the machine and also connected to the logic circuit.

27. An apparatus as recited in claim 26, further including:

a blocking element adapted to block tire fitting and removal tools for handling steel wheels to prevent actuation thereof when the machine is dealing with non-ferromagnetic wheel material.

28. An apparatus as recited in claim 18, further including:
a holding device for preliminary mounting of the wheel in the machine, said sensor being disposed at said holding device.

29. An apparatus as recited in claim 18, wherein said sensor is arranged in the region of a contact surface for pressing tire beads off wheel rim flanges at the outside surface of the tire fitting machine.

30. The apparatus for handling a wheel of a motor vehicle wheel unit on a tire fitting machine, as recited in claim 18, wherein the wheel material is ferromagnetic.

31. The apparatus for handling a wheel of a motor vehicle wheel unit on a tire fitting machine, as recited in claim 18, wherein the wheel material is nonferromagnetic.

* * * * *

UNITED STATES PATENT AND TRADEMARK OFFICE
CERTIFICATE OF CORRECTION

PATENT NO. : 5,913,254
DATED : June 15, 1999
INVENTOR(S) : DIEZ

It is certified that error appears in the above-indentified patent and that said Letters Patent is hereby corrected as shown below:

On the Face of the Patent:

Please change: "[73] Assignee: Hofmann Werkstatt-Lechnik GmbH"

To: - -[73] Assignee: Hofmann Werkstatt-Technik GmbH- -

Signed and Sealed this

Twenty-second Day of May, 2001

Attest:

NICHOLAS P. GODICI

*Attesting Officer*  *Acting Director of the United States Patent and Trademark Office*